United States Patent [19]

Grenkowitz et al.

[11] Patent Number: 5,569,846
[45] Date of Patent: Oct. 29, 1996

[54] MODULAR APPARATUS FOR ITERATIVELY EVALUATING COMBUSTION FLOW PROCESS

[75] Inventors: Robert W. Grenkowitz, Washington; Randolph C. King, Imlay City, both of Mich.

[73] Assignee: Ford Motor Company, Dearborn, Mich.

[21] Appl. No.: 433,185

[22] Filed: May 3, 1995

[51] Int. Cl.⁶ .................................... G01M 15/00
[52] U.S. Cl. ................... 73/116; 73/117.1; 73/118.2; 73/119 R; 137/269
[58] Field of Search ................. 73/37.5, 117.1, 73/118.2, 119 R, 865.6, 116; 137/269

[56] References Cited

U.S. PATENT DOCUMENTS

| | | | |
|---|---|---|---|
| 4,428,334 | 1/1984 | Klomp | 123/188 M |
| 4,524,807 | 6/1985 | Toliusis | 137/269 |
| 4,726,393 | 2/1988 | Herner | 137/269 |
| 4,889,153 | 12/1989 | Zepernick et al. | 137/269 |
| 4,996,875 | 3/1991 | Baer et al. | 73/119 R |
| 5,072,613 | 12/1991 | Baer et al. | |
| 5,088,285 | 2/1992 | Stevenson | |
| 5,222,524 | 6/1993 | Sekler et al. | 137/269 |
| 5,270,935 | 12/1993 | Dudek et al. | |
| 5,315,870 | 5/1994 | Schwegel et al. | 73/118.2 |
| 5,467,648 | 11/1995 | Igarashi et al. | 73/118.2 |

*Primary Examiner*—Richard Chilcot
*Assistant Examiner*—Eric S. McCall
*Attorney, Agent, or Firm*—Joseph W. Malleck

[57] ABSTRACT

A modular apparatus for evaluating flow processes. The apparatus has (i) a closure for a chamber, the closure defining at least one aperture and at least one seating basin facing away from the chamber; and (ii) at least two stacking elements cooperatively associated with each aperture for defining at least one fluid passage communicating with the aperture when stacked on one seating basin, the elements when stacked having mating walls meeting at a parting plane or line along the length of the passage, each element sealingly mating with each other, and one of the elements sealingly mating with the basin. The bottom stacking element snugly seats in and on the basin and defines a surface cooperating with the closure to form a cradle for a top stacking element when placed thereon.

10 Claims, 4 Drawing Sheets

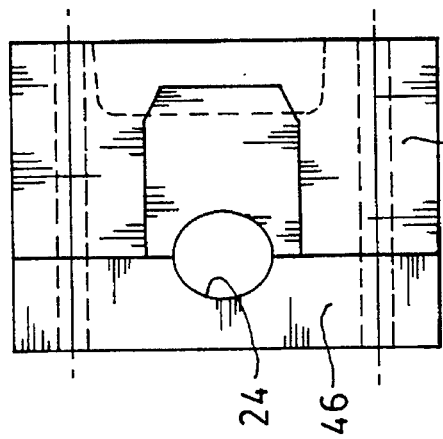
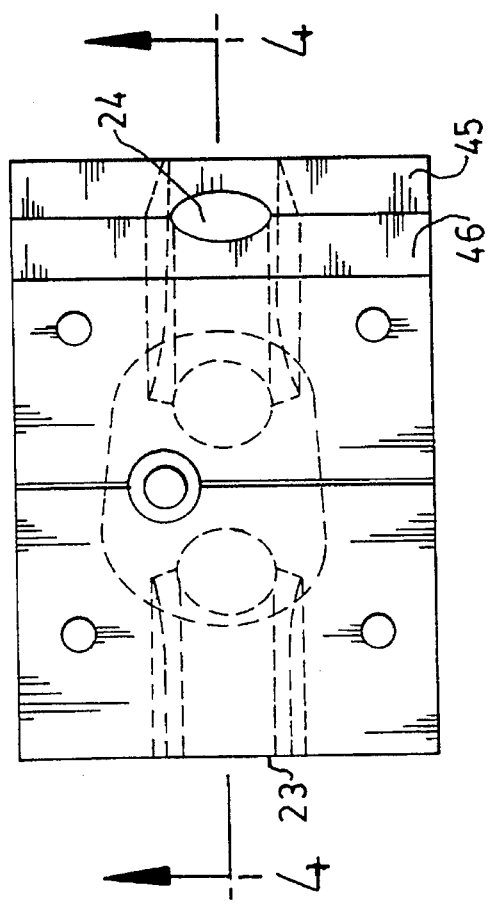
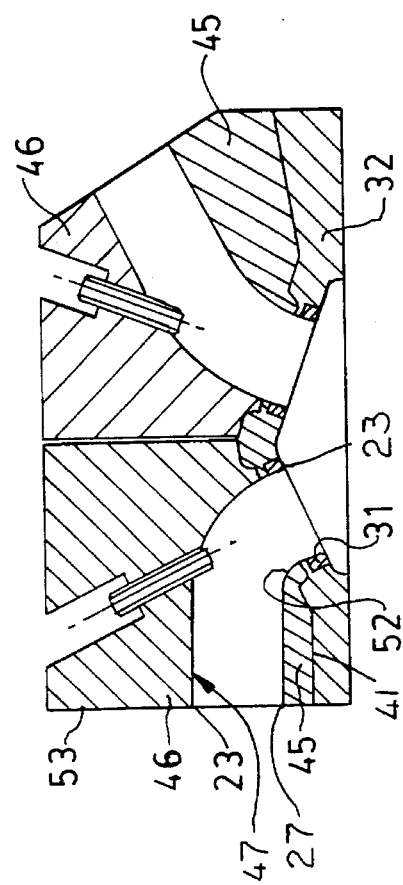

5,569,846

MODULAR APPARATUS FOR ITERATIVELY EVALUATING COMBUSTION FLOW PROCESS

BACKGROUND OF THE INVENTION

1. Technical Field

This invention relates generally to technology for designing internal combustion engine components that involve fluid flow, and more particularly to a modular flow box that allows for more rapid modification of internal passages in the flow box without requiring alteration of the entire flow box and without altering critical passage terminal portions.

2. Discussion of the Prior Art

It is necessary in the design process of an internal combustion head to interactively change the physical design of the internal passages of such head. Such changes are made in response to flow evaluations (measurement of flow volume and turbulence) while using a flow box. Existing flow boxes, used in the automotive industry today, remake the entire flow box to accommodate any physical design change of the internal passage because such boxes are constituted of two parts divided along internal passages. Any subtle contour change of the internal passages often require the making of numerous flow boxes to progressively achieve the desired flow. If the box portions are made by NC machining, there will be significant remachining to progressively create the box parts. This is very costly, requires considerable material consumed in each of the several flow boxes, and is relatively slow as reflected by the great number of flow boxes that must be constructed. More importantly, each time an engine head flow box is constructed, valve seat machining variables can slightly change so that the new flow box will give an evaluation not directly comparable to the previous flow box that was used. Even if the box parts are fabricated without NC machining, such as by cubital forming (powder resin layers) or by stereolithography (paper laminations), the fabrication time is considerable.

A commonly assigned U.S. patent application, U.S. Ser. No. 08/158,054 filed Nov. 26, 1993, entitled "Rapidly Making A Contoured Part" discloses a technique for rapid prototyping parts having complex internal cavities by use of sectioning into blocks or slabs which can be rapidly cast or rapidly machined. Such technique, however, did not appreciate the need to achieve interlocking and accurate self-alignment between blocks or slabs that make up the assembly, such self-alignment being essential to the interactive remaking of a flow box.

SUMMARY OF THE INVENTION

An object of this invention is to provide a test flow box that is made up of a plurality of modular stacking elements, one or more elements defining critical apertures while other elements define and divide internal passages along parting planes or lines for casting, whereby as little as one of the other elements can be reshaped to achieve a flow change without disturbing the critical apertures.

The invention herein that achieves such object, is a modular apparatus for evaluating flow processes, comprising: (a) a closure for a chamber, the closure defining at least one aperture and at least one seating basin facing away from said chamber; and (b) at least two stacking elements cooperatively associated with each aperture for defining at least one fluid passage communicating with the aperture when stacked on one seating basin, the elements when stacked having mating walls meeting at a parting plane or line along the length of the passage, each element sealingly mating with each other, and one of the elements sealingly mating with the basin. Preferably, a bottom stacking element snugly seats in and on the basin and defines a surface cooperating with the closure to form a cradle for a top stacking element when placed thereon.

BRIEF DESCRIPTION OF THE DRAWINGS

FIG. 4 is a central sectional elevational view of the flow box of FIG. 1;

FIG. 5 is a plan view of a flow box for a two-valve internal combustion engine head depicting passages similar to the structure of FIG. 4;

FIG. 6 is an end view of the structure of FIG. 5; and

As shown in FIGS. 1 and 2, the flow box 10 has a general trapezoidal silhouette in elevation and has a bottom wall 11 adapted to fit over a combustion chamber 12 (see FIG. 7) simulating an internal combustion engine block. The box is subdivided into a plurality of elements, one containing critical apertures such as the valve seat apertures. Other elements are stacked in a self-aligning manner onto the said "one" element. When reshaping of an internal flow passage is needed in response to a flow test, only one or two of the stacked elements need be affected, thereby saving considerably on time, effort and materials. Access openings 16 through the top of the flow box provide for valve stems 17 of the intake and exhaust valves 18, to extend out of the flow box for operation by suitable means 20 to achieve different degrees of valve opening. An access opening 21 is also provided in the top for insertion of an ignition element, such as a spark plug. Terminal portions 23, 24 of intake and exhaust ports are disposed on the sides of the box. The bottom 25 of the box has walls defining a roof 26 for closing the combustion chamber 12, such roof containing four apertures 27, 28, 29, 30 each embedded with a frusto-conical valve seat ring 31.

As shown in FIG. 3, the flow box 10 is comprised of six modular elements, each of which can be made rapidly from a computer aided design by one of NC machining the design from epoxy resin material or aluminum (or any metal that is stable and easily machined), cubital layering of powder resin, and stereolithograph laminations. The first modular element is a closure 32 presenting a flat bottom surface 25 extending across the equivalent of what would be a cylinder block of an internal combustion engine. The closure 32 has a dome or pyramidal walls defining the roof 26 of the combustion chamber 12. The apertures 27, 28, 29, 30 define entrances and exits for fluids to and from the combustion chamber. A central sleeve 33 extends from an opening 34 in the roof to receive an ignition element.

Figure 1:
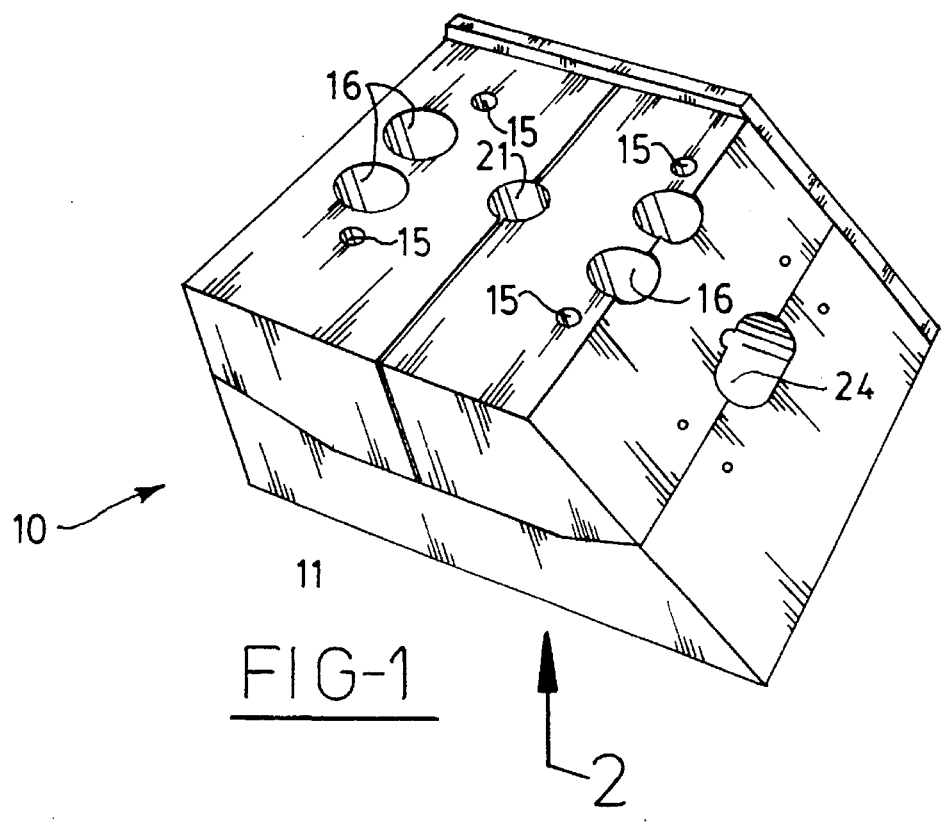
FIG. 1 is a perspective view of the modular flow box of this invention for a four-valve internal combustion engine head.
Figure 2:
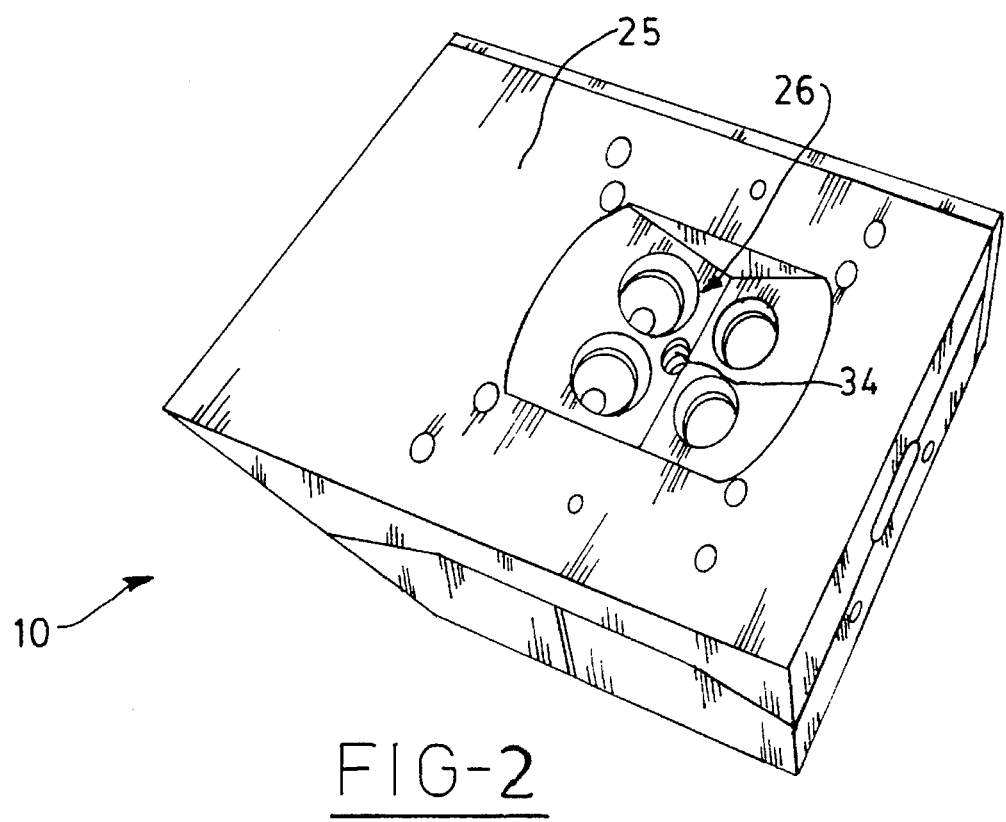
FIG. 2 is a bottom perspective view, taken in the direction of line 2 of FIG. 1.

The closure 32 defines seating basins 35 that face upwardly, away from the combustion chamber; the basins have inclined walls or planar surfaces 36, 37, 38, 39 and upright sidewall stop surfaces 60, 61, 62 and 63 along the periphery of the basins. The planar walls extend in a V-shape from a central flat web 43; each basin resides somewhat offset from a pair of apertures. One planar surface (38 or 37) extends across a pair of apertures (exhaust apertures 29, 30 or intake apertures 27, 28); the closure also has curvilinear stops 68 around such pair of apertures.

Figure 3:
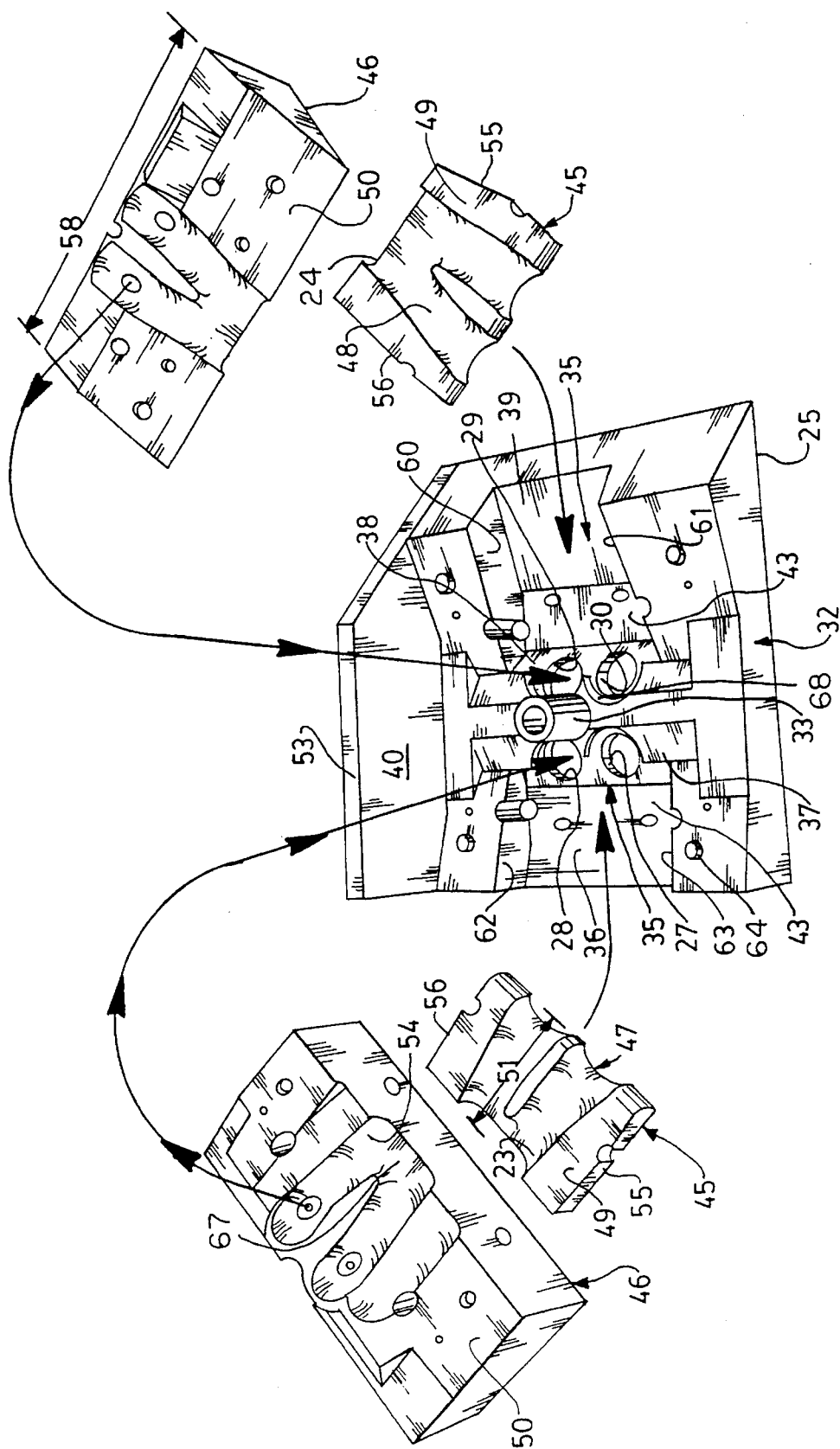
FIG. 3 is an exploded perspective view of the elements and closure constituting the flow box assembly of FIG. 1.

Each set of stacking elements 45, 46 co-operatively define a fluid passage 47 or 48 that communicate with a pair of apertures (either intake or exit apertures) when stacked on a basin. Each set of stacking elements have mating walls 49, 50 dividing each passage along a parting plane or line for casting the head; the division is along the length 51. As shown in FIGS. 3 and 4, intake passages 47 may have a curvature with a relatively sharp radius 52 extending from the entrance apertures 27, 28 allowing the passage to merge as one at 67 and extend to a terminal opening 23 in the upright side wall 53 of the flow box. The bottom stacking element 45 for the exhaust apertures (29, 30) will define the bottom portion of the exhaust flow passage 48; the flow passages 48 gradually merge to a common exhaust port 24.

The bottom stacking elements 45 when seated on the basins 35 will have their mating bottom walls sealingly engage the planar surfaces 36, 37 or 38, 39 of the closure. The upper surface (wall 49) of the bottom stacking element 45 will cooperatively define with the closure surface 41 a cradle for the top stacking element 46 when placed thereon in a sealing relationship. The top stacking element 46 will extend generally substantially across the entire width 58 of the flow box except for upright wall 40 with which it may abut and align (wall 40 being a sixth modular element of the flow box used as a mounting or support wall to attach the box to the flow test bench).

The modular elements of the flow box may be fabricated by any rapid prototyping technique. One technique comprises NC machining having essentially four basic steps, the first three of which are carried out within or under the control of a programmed computer. Design of the computer flow box as a graphic model should be as a three dimensional CAD (computer aided design) solid model or fully surfaced model. Constraints must be given to the computer to control the design and certain parameters, such as solid stock size to be machined, direction of machine tool access, and the finish for the complete part. The design should also involve the placement of securing bolt or screw openings (not shown) which do not interrupt the internal functional cavity of the flow box. In the graphic of the flow box, the closure will have a central combustion chamber roof, intake passages and exhaust passages along with valve seats for each of the passages. Bosses are defined including spark plug or fuel injector bosses, valve guides and joining bosses.

It is important to section the graphic model into blocks or slabs. The graphic model, in this case, was sectioned into a relatively planar bottom closure 32, and two pairs of stacking elements 45, 46. Sectioning is constrained by the minimal thickness that can be used to achieve a stable block or slab when fabricated of resin, preferably no less than 0.060 inches. The minimum thickness and strength is necessitated by the need for full three-axis contoured machining, not merely vertical cutting as with laminations or sheet metal. The sectioning of the computer graphic model is adapted to provide for overlap between the slabs or blocks graphic members. Such overlapping aspect is necessary to maintain continuity between surfaces.

Once the solid model has been sectioned into the blocks or slabs, tool cutting paths are derived by the computer program for the plurality of the exposed surfaces that are to be machined in each solid member, preferably at the opposed top and bottom surfaces of horizontal section solid members. Tool paths for the flow box are then generated. Software that can be utilized to derive such tool paths is generally known as Computer Vision®/CAD/CAM; such system consists of solid modeling, numerical control, and drafting.

In carrying out the third step of the basic process, CNC milling is utilized to carve the various internal passage/surfaces out of each solid member while the solid member is ridgedly fixed to the milling machine. It is important that the milling machine be able to remove material in the X, Y and Z axes, to create a duplicate of the graphic model.

The slabs or modular elements of the flow box are assembled together after machining utilizing the self-location features of the stacking elements. Locating pins 64 are introduced to precisely align the various members of the modular assembly. Additionally, fasteners may be employed through openings to clamp the assembly together during handling.

Figure 7:
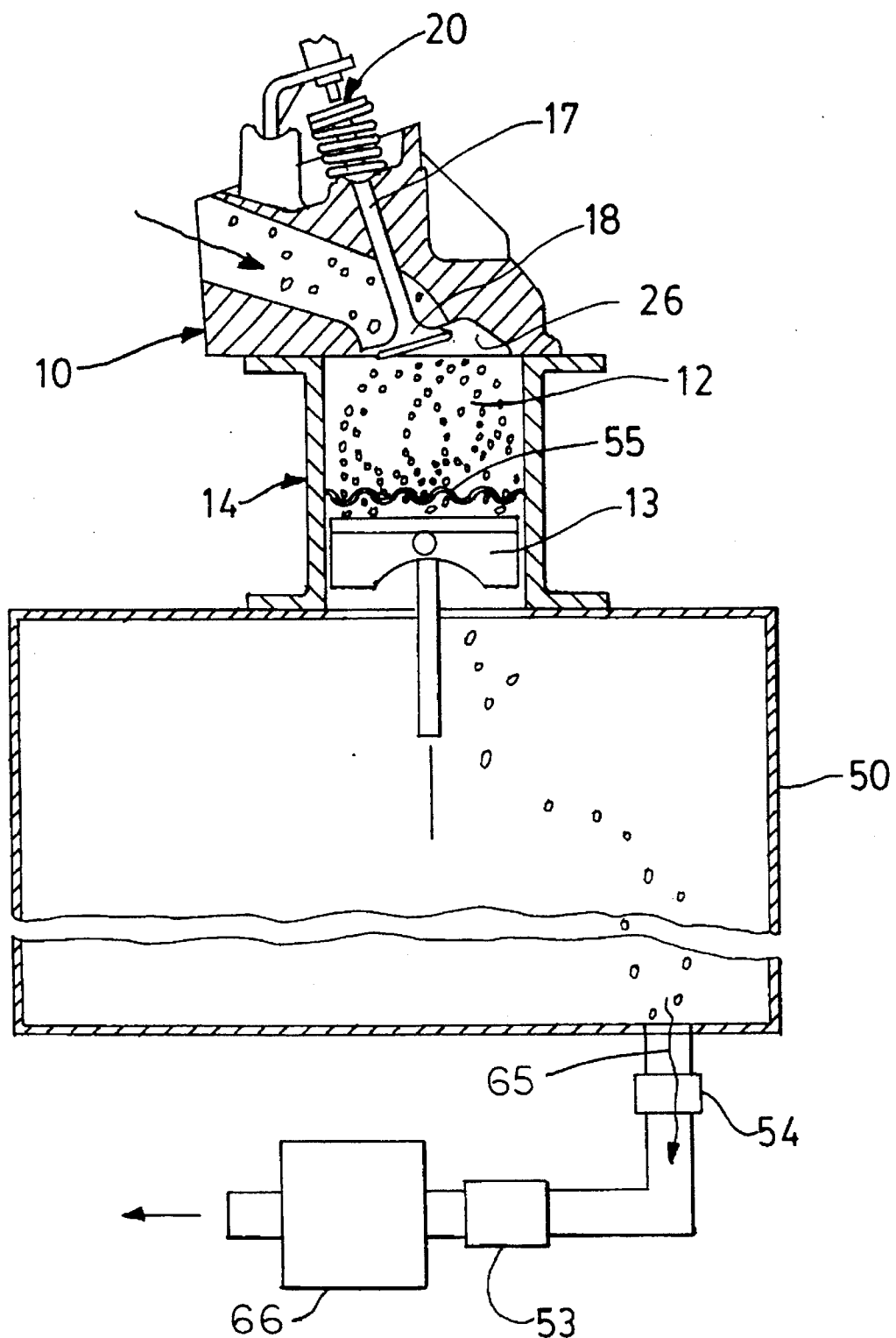
FIG. 7 is a sectional elevational view of the flow box assembled with apparatus for test use.

The flow box is used in the following manner as shown in FIG. 7. The flow box 10 is mounted on a simulated block 14 having a cylinder wall with an internal diameter that envelopes the roof wall 26 of the flow box as it fits thereover. The cylinder wall may be closed at its bottom except for an outflow passage communicating with an air manifold 50; valving 18 is adjustable to different degrees of aperture opening by a manual means 20 operating on the valve stems 17. Gas flow 65 is conducted through the flow box 10, block 14, and manifold 50 by use of a blower 66 connected to the manifold 50. A flow meter 53 measures the flow rate after a flow valve 54 opens the communication. Alternatively, the cylinder wall may be closed by a vertically adjustable screen 55 supported on a peripheral band 13; the adjustable screen allows simulation of different positions of a piston that correspond to different valve openings and which may affect flow.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. An apparatus for evaluating flow processes, comprising:

(a) a closure for a chamber, the closure defining at least one aperture and at least one seating basin facing away from said chamber; and (b) at least two stacking elements cooperatively associated with each aperture for defining at least one fluid passage having walls communicating with said aperture when stacked on said one basin, the elements when stacked having mating walls meeting at a parting plane or line along the length of the passage, each element sealingly mating with each other, and one of the elements sealingly mating with said basin, the passage walls of one or more of said stacking elements being reshapable in response to flow evaluation without remaking said closure.

2. A modular apparatus for iteratively evaluating combustion flow processes, comprising:

(a) a closure for a simulated combustion chamber, the closure defining at least one aperture surrounded by a valve seat and defining at least one basin facing away from said combustion chamber, said closure having curvilinear stop about said aperture; and (b) a set of stacking elements cooperatively associated with each aperture and valve seat for defining at least one fluid passage communicating with said aperture when stacked on said one basin, said elements when stacked having mating walls meeting at a parting plane or line along the length of said passage, each stacking element sealingly mating with each other, and one of the elements sealingly mating with said basin, one of said elements snugly fitting in and on said basin while intersecting said aperture, another of said elements fitting snugly onto said one element while also intersecting said aperture and snugly engaging said curvilinear stop; and (c) means for securing said closure and sets of stacking elements together for flow testing.

3. The aperture as in claim 2, in which said one element defines a cradle to receive said another element matingly thereon, said cradle and curvilinear stop cooperating to self-align said another element.

4. A modular apparatus for iteratively evaluating combustion flow processes, said apparatus being constituted of rapidly formed modules that interlock to form an assembly with internal flow passages, comprising:

(a) a head closure for a combustion chamber, said closure having walls defining at least one entrance for gases to enter said chamber and at least one exit for gases to leave the chamber, and an access opening, said closure also providing entrance and exit basins, each basin seating other elements associated with one of said entrance and exit;

(b) a first set of stacking elements associated with said entrance and cooperatively defining at least one intake passage when stacked on the entrance basin; and (c) a second set of stacking elements associated with said exit and cooperatively defining at least one exhaust passage when stacked on the exit basin; each set of stacking elements (i) having mating walls that divide said respective defined passage, and (ii) being cradled in its associated basin for accurate self-alignment to said closure; and (d) means for securing said closure and stacking elements together for flow evaluation.

5. The apparatus as in claim 4, in which each basin is comprised of V-shaped planar surfaces.

6. The apparatus as in claim 4, in which each basin has upright side walls for laterally aligning the stacking elements mating therewith.

7. The apparatus as in claim 4, in which said cradling is assured by semi-circular lips on said closure surrounding each of said entrance and exits for aligning said set of elements.

8. The apparatus as in claim 4, in which said closure has flat shoulder stops and upright side wall stops normal to said basin walls, said stops operating to cradle and self-align said set of elements thereon.

9. The apparatus as in claim 4, in which said closure defines two exits and two entrance apertures, the passages from each of said entrances converging and the passages from each of said exits merging.

10. The apparatus as in claim 4, in which the closure and stacking elements are fabricated of a material selected from the group of powder resin, paper laminations, and stable machineable metal.

\* \* \* \* \*